(12) United States Patent
Jia et al.

(10) Patent No.: US 11,188,056 B2
(45) Date of Patent: Nov. 30, 2021

(54) FEEDRATE SCHEDULING METHOD FOR FIVE-AXIS DUAL-SPLINE CURVE INTERPOLATION

(71) Applicant: Dalian University of Technology, Dalian (CN)

(72) Inventors: Zhenyuan Jia, Dalian (CN); Jianwei Ma, Dalian (CN); Dening Song, Dalian (CN); Siyu Chen, Dalian (CN); Guangzhi He, Dalian (CN); Fuji Wang, Dalian (CN); Wei Liu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 519 days.

(21) Appl. No.: 16/322,290

(22) PCT Filed: Jan. 7, 2018

(86) PCT No.: PCT/CN2018/071689
§ 371 (c)(1),
(2) Date: Jan. 31, 2019

(87) PCT Pub. No.: WO2019/047458
PCT Pub. Date: Mar. 14, 2019

(65) Prior Publication Data
US 2020/0004228 A1    Jan. 2, 2020

(30) Foreign Application Priority Data

Sep. 11, 2017 (CN) .......................... 201710809848.2

(51) Int. Cl.
*G05B 19/416* (2006.01)

(52) U.S. Cl.
CPC ............... *G05B 19/4163* (2013.01); *G05B 2219/34015* (2013.01); *G05B 2219/34083* (2013.01);
(Continued)

(58) Field of Classification Search
None
See application file for complete search history.

(56) References Cited

U.S. PATENT DOCUMENTS

| 2004/0158356 A1* | 8/2004 | Webb | G05B 19/41 700/250 |
| 2011/0166693 A1* | 7/2011 | Nishibashi | G05B 19/4086 700/187 |

FOREIGN PATENT DOCUMENTS

| CN | 101976060 A | 2/2011 |
| CN | 102298358 A | 12/2011 |

(Continued)

*Primary Examiner* — Sean Shechtman
(74) *Attorney, Agent, or Firm* — Muncy, Geissler, Olds & Lowe, P.C.

(57) ABSTRACT

This invention, a feedrate scheduling method for five-axis dual-spline curve interpolation, belongs to multi-axis NC (Numerical Control) machining filed, featured a feedrate scheduling method with constant speed at feedrate-sensitive regions under axial drive constraints for five-axis dual-spline interpolation. This method first discretizes the tool-tip spline with equal arc length, thus getting the relation between the axial motion and the toolpath by computing the first, second, and third order derivatives of the axial positions with respect to the tool-tip motion arc length. After that, determine the feedrate-sensitive regions with the constraints of axial drive limitations and the objective of balanced machining quality and efficiency. Finally, determine the acceleration/deceleration-start-point curve parameters by bi-directional scanning. The invented method can effectively make a balance between the feed motion stability and efficiency in five-axis (Continued)

(Fig.1 as an illustration in Abstract)

Figure 3:
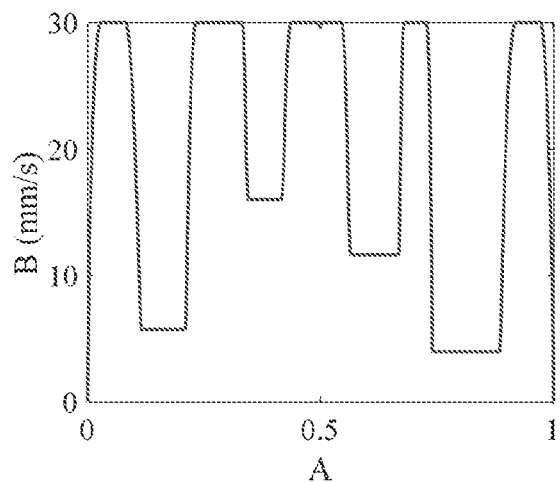

machining, and possesses a high computational efficiency and a good real-time capability.

1 Claim, 4 Drawing Sheets

(52) U.S. Cl.
CPC .......... *G05B 2219/34135* (2013.01); *G05B 2219/35261* (2013.01); *G05B 2219/43059* (2013.01); *G05B 2219/43156* (2013.01)

(56) References Cited

FOREIGN PATENT DOCUMENTS

| | | |
|---|---|---|
| CN | 103592891 A | 2/2014 |
| CN | 104281099 A | 1/2015 |
| CN | 105759725 A | 7/2016 |
| JP | 2006053789 A | 2/2006 |

* cited by examiner

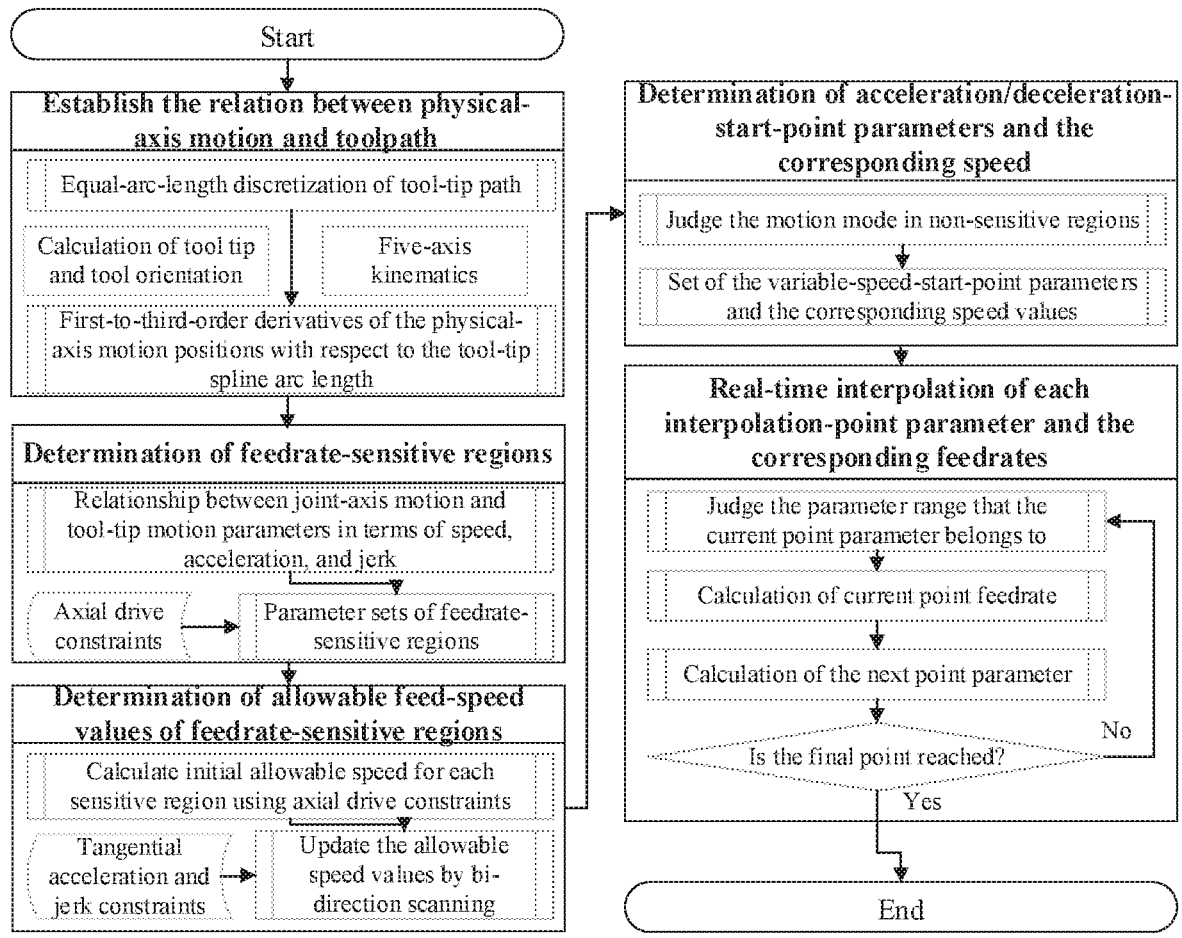
Fig. 1(Fig.1 as an illustration in Abstract)
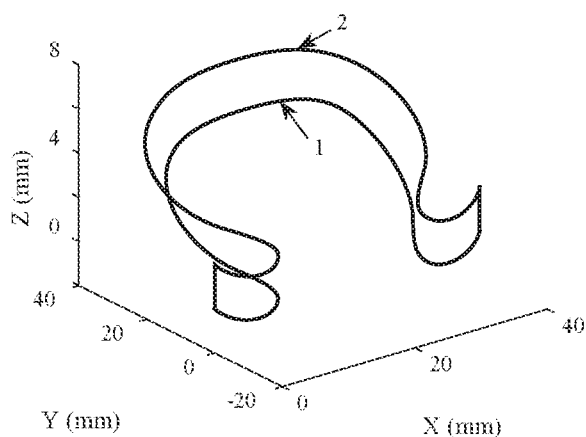
Fig. 2

FEEDRATE SCHEDULING METHOD FOR FIVE-AXIS DUAL-SPLINE CURVE INTERPOLATION

TECHNICAL FIELD

This invention belongs to high-precision and high-efficiency intelligent multi-axis NC (Numerical Control) machining filed, featured a feedrate scheduling method for five-axis dual-spline interpolation under physical-axis drive constraints.

BACKGROUND TECHNIQUES

Currently, curve interpolation techniques have been widely focused and researched due to their advantages in high approximation precision, smooth motion and easy to stored and transformed NC codes, etc. comparing with traditional linear/circular interpolation techniques. During curve interpolation, the feedrate scheduling for each position on the curved path plays as a premise for high-quality and high-efficiency machining. If the feedrate is too high, the actual axial motion velocity, acceleration, and jerk may exceed their corresponding acceptable limitations, thus inducing phenomenon such as motion wave and machining vibration, which is bad to the machining precision and quality. Otherwise, if the feedrate is too low, the machining efficiency will be degraded although drive constraints can be satisfied. Therefore, it is of great significance to schedule a reasonable feedrate profile for curve interpolation according to the axial drive constraints. At present, although there are lots of studies on feedrate scheduling methods for three-axis curve interpolation, those for five-axis dual-spline interpolation remain lacking. In five-axis dual-spline curve interpolation, the toolpath is determined by a tool-tip motion spline and a motion spline of a second point on the tool axis besides the tool tip. The toolpath is followed by not only three translational axes motion but also two coupled rotary axes motion, which results in strong nonlinear relationship between the tool-tip motion and the joint axes motion, and this poses great challenges for reasonable scheduling of the tool-tip motion feedrate profile. As a result, it becomes one of the most urgent problems in five-axis NC curve interpolation field to schedule the tool-tip speed according to the axial drive constraints.

The existing paper "Feedrate interpolation with axis jerk constraints on 5-axis NURBS and G1 tool path", Beudaert et al., International Journal of Machine Tools and Manufacture, 2012, 57: 73-82, first discretized the five-axis toolpath with equal time-step, and computed the corresponding allowable displacement range corresponding to each discrete points under drive constraints. After that, the bisection iteration was used to search a time-optimal feed speed value. However, this method generates time-varying speed profile, which makes the feedrate change frequently, and this is bad to the machining quality although the efficiency can be improved as much as possible. Additionally, iterative computation should be fulfilled in each period, which weakens the real-time capability. The paper "A smooth curve evolution approach to the feedrate planning on five-axis toolpath with geometric and kinematic constraints", Sun et al., International Journal of Machine Tools and Manufacture, 2015, 97: 86-97, proposed a five-axis curve-interpolation feedrate iterative scheduling method based on proportional adjustment of the speed value according to the principle of curve evolution, so as to satisfy the axial drive constraints. However, this method belongs to off line method due to the heavy computational burden, which makes it can hardly be used to real-time interpolator.

CONTENTS OF THE INVENTION

Aiming at solving the defects of the existing techniques, a computational efficient feedrate scheduling method with axial drive constraints for five-axis dual-spline interpolation is invented. This method first disperse the toolpath with equal arc length, thus computing the first-to-third-order derivatives of the axial positions with respect to the arc-length parameter. After that, determine the feedrate-sensitive regions with the axial drive constraints and the machining quality and efficiency balancing objective. Finally, determine the acceleration/deceleration-start-point parameter and their corresponding speed values, and schedule constant speed at feedrate-sensitive regions and smooth speed profile within feedrate-non-sensitive regions using S-shape acceleration/deceleration mode. The invented method can effectively balance the motion stability and the efficiency in five-axis dual-spline interpolation, and the computational burden of the algorithm is low, which is good for the real-time capability.

The technique proposal used in the present invention is a feedrate scheduling method for five-axis dual-spline curve interpolation. Its characteristic is that the relationship between the axial motion and tool-tip motion is obtained by computation of the first, second, and third-order derivatives of the axial positions with respect to the arc-length parameter based on tool-tip motion spline equal-arc-length discretization, and the feedrate-sensitive regions are determined with axial drive constraints and the machining quality and efficiency balancing objectives; after that, the acceleration/deceleration-start-point parameters by bi-direction scanning; and finally, schedule constant speed at feedrate-sensitive regions and smooth speed profile within feedrate-non-sensitive regions using S-shape acceleration/deceleration mode. The detail procedure is as follows.

Step One: Establish the relationship between the axial motion and the tool-pose trajectory.

Denote the tool-tip motion spline equation of the dual-NURBS curve to be interpolated as $C_P = C_P(u)$, and the motion spline of second-point on the tool axis except the tool tip as $C_Q = C_Q(u)$. First, discretize the tool-tip motion spline with equal arc length. Denote the arc-length step as $\delta_s$, and the ith discrete point parameter after discretization as $u_{d,i}$, thus by using the second-order Taylor expansion, the (i+1)th point parameter $u_{d,i+1}$ can be computed as Eq (1):

$$u_{d,i+1} = u_{d,i} + \frac{1}{\|C'_P(u_{d,i})\|}\delta_S - \frac{C'_P(u_{d,i}) \cdot C''_P(u_{d,i})}{2\|C'(u_{d,i})\|^4}\delta_S^2 \qquad (1)$$

where $\| \ \|$ stands for the Euclidean norm, additionally, $C'_P(u_{d,i})$ and $C''_P(u_{d,i})$ are the first and second order derivatives of $C_P(u)$ with respect to u at $u_{d,i}$.

Denote the tool tip and the tool-axis vector as $R=[R_x, R_y, R_z]^T$ and $O=[O_x, O_y, O_z]^T$, respectively. After obtaining of the discrete-point parameters $u_{d,i}$, i=1, 2, ..., $N_d$ ($N_d$ is the total amount of discrete points), compute the i-th tool tip $R_i=[R_{x,i}, R_{y,i}, R_{z,i}]^T$ and tool-orientation vector $O_i=[O_{x,i}, O_{y,i}, O_{z,i}]^T$ corresponding to i-th discrete point as:

$$\begin{cases} R_i = C_P(u_{d,i}) \\ O_i = \dfrac{C_Q(u_{d,i}) - C_P(u_{d,i})}{\|C_Q(u_{d,i}) - C_P(u_{d,i})\|} \end{cases} \quad (2)$$

Then, calculate the five joint-axis positions according to the obtained tool tip and tool orientation of Eq. (2) using inverse kinematics of five-axis machine tools, which are denoted in one vector q with five elements corresponding to the five physical axes of the machine tool, respectively. Denote ith joint-axis motion position vector corresponding to i-th tool tip and i-th tool vector as $q_i$, thus, the first-to-third-order derivatives of the physical axial positions with respect to the tool-tip trajectory arc-length parameter can be calculated as:

$$\begin{cases} q_{s,i} = \dfrac{q_{i+1} - q_{i-1}}{2\delta_s} \\ q_{ss,i} = \dfrac{q_{s,i+1} - q_{s,i-1}}{2\delta_s} \\ q_{sss,i} = \dfrac{q_{ss,i+1} - q_{ss,i-1}}{2\delta_s} \end{cases} \quad (3)$$

where $q_{s,i}$, $q_{ss,i}$, and $q_{sss,i}$ are first-order, second-order, and third-order derivatives of the physical axial positions with respect to the tool-tip trajectory arc-length parameter, respectively. The Eq. (3) expresses the relationship between the axial motion and the tool-pose motion.

Step Two: Determination of the feedrate-sensitive regions

According to the principle of differentiation, the relationship between axial and tool-tip motion velocity, acceleration, and jerk can be derived as:

$$\begin{cases} \dot{q} = q_s \dot{s} \\ \ddot{q} = q_{ss} \dot{s}^2 + q_s \ddot{s} \\ \dddot{q} = q_{sss} \dot{s}^3 + 3q_{ss} \dot{s}\ddot{s} + q_s \dddot{s} \end{cases} \quad (4)$$

where $\dot{q}$, $\ddot{q}$, and $\dddot{q}$ are first, second, and third order derivatives of axial motion position with respect to time, i.e. axial velocity, acceleration, and jerk vectors, respectively; in addition, $\dot{s}$, $\ddot{s}$, and $\dddot{s}$ are first, second, and third order derivatives of tool-tip motion position with respect to time, i.e. tool-tip velocity, tangential acceleration, and jerk, respectively.

Denote the physical axial velocity constraint, acceleration constraint, and jerk constraint as $\dot{q}_{max}$, $\ddot{q}_{max}$, and $\dddot{q}_{max}$, respectively, and the reference tool-tip motion speed constraint as $v_{max}$. First, let the tool-tip motion acceleration constraint $\alpha_{t,max}$ be the minimum value of the translational axes acceleration constraints in $\ddot{q}_{max}$, and let the tool-tip motion jerk constraint $j_{t,max}$ be the minimum value of the translational axes jerk constraints in $\dddot{q}_{max}$. Then, aiming at balancing the machining efficiency and motion stability, optimize $\alpha_{t,max}$ and $j_{t,max}$ so as to determine the feedrate-sensitive regions which are defined as the areas where the axial velocity, acceleration, and jerk can be exceeded when maximum tool-tip speed, acceleration, and jerk are utilized. According to Eq. (4), it has $$\begin{cases} |\dot{q}| = |q_s||\dot{s}| \le |q_s|v_{max} \\ |\ddot{q}| \le |q_{ss}|\dot{s}^2 + |q_s||\ddot{s}| \le |q_{ss}|v_{max}^2 + |q_s|a_{t,max} \\ |\dddot{q}| \le |q_{sss}||\dot{s}|^3 + 3|q_{ss}||\dot{s}||\ddot{s}| + |q_s||\dddot{s}| \le |q_{sss}|v_{max}^3 + \\ \quad 3|q_{ss}|v_{max}a_{t,max} + |q_s|j_{t,max} \end{cases} \quad (5)$$

Hereby, the discretized position where one of the inequations $|q_{s,i}|v_{max}>\dot{q}_{max}$, $|q_{ss,i}|v_{max}^2+|q_{s,i}|\alpha_{t,max}>\ddot{q}_{max}$, and $|q_{sss,i}|v_{max}^3+3|q_{ss,i}|v_{max}\alpha_{t,max}+|q_{ss,i}|j_{t,max}>\dddot{q}_{max}$ can be satisfied is determined as the point inside the feedrate-sensitive regions. Denote the total number of the sensitive regions as $N_{sr}$, and the sequence number of the discretized points corresponding to the start and end position of kth sensitive region as $n_{s,k}$ and $n_{e,k}$, respectively, thus the feedrate-sensitive regions can be expressed by discretized-point sequence number sets as $\{[n_{s,k}, n_{e,k}]\}$, $k=1, 2, \ldots, N_{sr}$. Hence, the total arc length $l_{sr}$ of the feedrate-sensitive regions on the tool-tip motion trajectory can be calculated by:

$$l_{sr} = \delta_d \cdot \sum_{k=1}^{N_{sr}} (n_{e,k} - n_{s,k}) \quad (6)$$

The total arc length of the tool-tip motion spline is denoted as $l_t$. If $l_{sr}<l_t/2$, indicating that most of the areas on the toolpath belong to feedrate-sensitive regions, where the maximum speed $v_{max}$ can be adopted, therefore, the motion stability and efficient machining can be simultaneously ensured, and the scheduled federate-sensitive regions are satisfactory. Otherwise, if $l_{sr}>l_t/2$, indicating that most areas on the toolpath belong to feedrate-non-sensitive regions, where the minimum allowable speed values within the corresponding regions should be used, thus the efficiency will be low although the motion stability is permissible. Therefore, the $\alpha_{t,max}$ and $j_{t,max}$ values are optimized in this case, so as to optimize the feedrate-sensitive regions. The optimization procedure is to find tangential acceleration and jerk constraints between zero and original $\alpha_{t,max}$ and $j_{t,max}$ by using bisection method, so as to make the total arc length of sensitive regions $l_{sr}$ happens to be half of the arc length of the whole toolpath $l_t$, i.e. $l_{sr}=l_t/2$. Finally, the parameter set of the obtained feedrate-sensitive regions is expressed as $\{[u_{s,k}, u_{e,k}]\}$, $k=1, 2, \ldots, N_{sr}$.

Step Three: Calculation of the allowable speed of each feedrate-sensitive region First, determine the initial constant speed of each feedrate-sensitive region according to axial drive constraints. In order to make a balance between motion stability and efficiency, constant speed is scheduled inside each feedrate-sensitive region, and in this circumstance, the tangential acceleration $\ddot{s}$ and jerk $\dddot{s}$ are all zeros. According to Eq. (4), the initial constant speed value $\dot{s}_{o,k}$ for kth feedrate-sensitive region can be derived as:

$$\dot{s}_{o,k} = \min\left(\min\left(\dfrac{\dot{q}_{max}(j)}{q_{s,i}(j)}\right), \min\left(\sqrt{\dfrac{\ddot{q}_{max}(j)}{q_{ss,i}(j)}}\right), \min\left(\sqrt[3]{\dfrac{\dddot{q}_{max}(j)}{q_{sss,i}(j)}}\right)\right) \quad (7)$$

$$i \in \{n_{s,k}, \ldots, n_{e,k}\}, j \in \{1, \ldots, 5\}$$

where min( ) means the minimum function.

Then, update the speed values of feedrate-sensitive regions with tangential acceleration and jerk constraints in S-shape acceleration/deceleration mode. When the tangential acceleration and jerk constraints are $\alpha_{t,max}$ and $j_{t,max}$, respectively, the required displacement $s_{req}(\dot{s}_{start}, \dot{s}_{end})$ from starting velocity $\dot{s}_{start}$ to ending velocity $\dot{s}_{end}$ in S-shape acceleration/deceleration mode is calculated by:

$$s_{req}(v_{start}, v_{end}) = \qquad (8)$$

$$\begin{cases} \dot{s}_{start}(t_1 + t_2 + t_3) + \frac{1}{2} j_{t,max} t_1^2(t_2 + t_3) + \frac{1}{2} a_{max}(t_2^2 + t_3^2) + a_{max} t_2 t_3, \\ \qquad\qquad\qquad\qquad\qquad\qquad v_{start} < v_{end} \\ \dot{s}_{start}(t_1 + t_2 + t_3) - \frac{1}{2} j_{t,max} t_1^2(t_2 + t_3) - \frac{1}{2} a_{max}(t_2^2 + t_3^2) - a_{max} t_2 t_3, \\ \qquad\qquad\qquad\qquad\qquad\qquad v_{start} > v_{end} \end{cases}$$

where the maximum acceleration $\alpha_{max} = j_{t,max} t_1$, increase acceleration/deceleration time $t_1$, constant acceleration/deceleration time $t_2$ and decrease acceleration/deceleration time $t_3$ are calculated as:

$$t_1 = \begin{cases} \frac{a_{t,max}}{j_{t,max}} & |\dot{s}_{end} - \dot{s}_{start}| > \frac{a_{t,max}^2}{j_{t,max}} \\ \sqrt{\frac{|\dot{s}_{end} - \dot{s}_{start}|}{j_{t,max}}}, & |\dot{s}_{end} - \dot{s}_{start}| \leq \frac{a_{t,max}^2}{j_{t,max}} \end{cases} \qquad (9)$$

$$t_2 = \begin{cases} \frac{|\dot{s}_{end} - \dot{s}_{start}| - a_{t,max}^2/j_{t,max}}{a_{t,max}}, & |\dot{s}_{end} - \dot{s}_{start}| > \frac{a_{t,max}^2}{j_{t,max}} \\ 0, & |\dot{s}_{end} - \dot{s}_{start}| \leq \frac{a_{t,max}^2}{j_{t,max}} \end{cases}$$

$$t_3 = t_1$$

The feedrate-sensitive region speed value $\dot{s}_{o,k}$ is updated by bi-directional scanning, and the detail procedure is given below.

At first, backward scanning from $k=N_{sr}$ to $k=1$ for scheduling of the deceleration procedure speed. The procedure is:

1) Let $k=N_{sr}$;

2) When $k=N_{sr}$, determine whether $n_{e,k}=N_d$ is satisfied or not, and if $n_{e,k}=N_d$, goto step 3); else goto step 5). On contrary, when $k \neq N_{sr}$, goto step 6).

3) In this case, the ending region of the toolpath belongs to the feedrate-sensitive region. Calculate the required displacement $s_{req}(\dot{s}_{o,k}, 0)$ of deceleration process from $\dot{s}_{o,k}$ to 0 using Eq. (8), and the arc length of this sensitive region which is denoted as $l_k$:

$$l_k = \delta_d \cdot (n_{e,k} - n_{s,k}) \qquad (10)$$

If $s_{req}(\dot{s}_{o,k}, 0) \leq l_k/2$, goto step 4); else, find a speed value $\dot{s}_{B,k}$ to meet $s_{req}(\dot{s}B,k0)=l_k/2$ using dichotomy method between $\dot{s}_{o,k}$ and 0. Update $\dot{s}_{o,k}$ by letting $\dot{s}_{o,k}=\dot{s}_{B,k}$, and recalculate $s_{req}(\dot{s}_{o,k}, 0)$, then goto step 4).

4) When the ending region of the toolpath belongs to the feedrate-sensitive region, the final deceleration process must be executed within the sensitive region. Therefore, it is necessary to determine whether the axial drive constraints are exceeded when performing deceleration within the last sensitive region. To this end, the number of discretized points of the final deceleration, denoted as $n_f$, is first computed by $$n_f = \text{int}\left(\frac{s_{req}(\dot{s}_{o,k}, 0)}{\delta_d}\right) \qquad (11)$$

where int( ) means round down. According to the relationship between displacement and tangential velocity, acceleration and jerk during S-shape acceleration/deceleration process, reversely solve the discretized-point speed $\dot{s}_{f,j}$, tangential acceleration $\ddot{s}_{f,j}$, and tangential jerk $\dddot{s}_{f,j}$ ($j \in \{n_d - n_f, \ldots, n_d\}$), within the deceleration process of $N_{sr}$-th federate-sensitive region. Then solve the request axial speed $\dot{q}_{f,j}$, the axial acceleration $\ddot{q}_{f,j}$, and the axial jerk $\dddot{q}_{f,j}$ ($j \in \{n_d - n_f, \ldots, n_d\}$) within the deceleration process of $N_{sr}$-th federate-sensitive region by substituting $\dot{s}_{f,j}$, $\ddot{s}_{f,j}$, and $\dddot{s}_{f,j}$ to Eq. (4). Finally, calculate the minimum ratio $K_f$ between the axial drive limitations and the request axial drive parameters in the final deceleration process by $$K_f = \qquad (12)$$

$$\min\left(\min\left(\left|\frac{\dot{q}_{max}(i)}{\dot{q}_{f,j}(i)}\right|\right), \min\left(\sqrt{\left|\frac{\ddot{q}_{max}(i)}{\ddot{q}_{f,j}(i)}\right|}\right), \min\left(\sqrt[3]{\left|\frac{\dddot{q}_{max}(i)}{\dddot{q}_{f,j}(i)}\right|}\right)\right),$$

$$i \in \{1, \ldots, 5\}, j \in \{n_{s,k}, \ldots, n_{e,k}\}$$

By comparing $K_f$ and 1, determine a tuning ratio for the tangential speed, acceleration, and jerk in the deceleration process of $N_{sr}$-th federate-sensitive region, denoted as $K_{f,t}$, by the following equation:

$$K_{f,t} = \min(K_f, 1) \qquad (13)$$

Let the tangential acceleration constraint of the deceleration process of $N_{sr}$-th federate-sensitive region $\alpha_{f,max} = K_{f,t}^2 \cdot \alpha_{t,max}$, and the tangential jerk constraint of the deceleration process of $N_{sr}$-th federate-sensitive region $j_{f,max} = K_{f,t}^3 \cdot j_{t,max}$. Then update the allowable speed value corresponding to $N_{sr}$-th feedrate-sensitive region by letting $\dot{s}_{o,k} = K_{f,t} \cdot \dot{s}_{o,k}$.

5) When $k=N_{sr}$ and $n_{e,k} \neq N_d$, which indicating that there exists feedrate-non-sensitive region between the final point on the toolpath and the last sensitive region, schedule a deceleration process within this non-sensitive region. Calculate the required displacement $s_{req}(\dot{s}_{o,k}, 0)$ of deceleration process from $\dot{s}_{o,k}$ to 0 using Eq. (8), and the arc length $l_f$ of this final non-sensitive region by $$l_f = \delta_d \cdot (N_d - n_{e,k}) \qquad (14)$$

If $s_{req}(\dot{s}_{o,k}, 0) > l_{r,k}$, find a speed value $\dot{s}_{B,k}$ to meet $s_{req}(\dot{s}_{B,k}, 0) = l_{r,k}$ using dichotomy method between 0 and $\dot{s}_{o,k}$. Then, update the allowable speed value $\dot{s}_{o,k}$ of this feedrate-sensitive region by letting $\dot{s}_{o,k} = \dot{s}_{B,k}$ and goto step 7).

6) Evaluate whether it is a deceleration procedure. If $\dot{s}_{o,k} \leq \dot{s}_{o,k+1}$ which indicates it is an acceleration process, goto step 7); else, calculate the required displacement $s_{req}(\dot{s}_{o,k}, \dot{s}_{o,k+1})$ of deceleration process from $\dot{s}_{o,k}$ to, and the arc length of the kth feedrate-non-sensitive region $l_{r,k}$:

$$l_{r,k} = \delta_d \cdot (n_{s,k+1} - n_{e,k}) \qquad (15)$$

When $s_{req}(\dot{s}_{o,k}, \dot{s}_{o,k+1}) > l_{r,k+1}$, find a speed value $\dot{s}_{B,k}$ to meet $s_{req}(\dot{s}_{o,k}, \dot{s}_{o,k+1}) = l_{r,k+1}$ using dichotomy method between 0 and $\dot{s}_{o,k}$. Then, update the allowable feedrate value $\dot{s}_{o,k}$ of this sensitive region by letting $\dot{s}_{o,k} = \dot{s}_{B,k}$ and goto step 7).

7) If k=1, end the backward scanning; else, let k=k−1 and goto step 2).

Then, forward scanning from k=1 to k=$N_{sr}$ for scheduling of the feedrate-sensitive region speed values of the acceleration procedure.

1) Let k=1.

2) When k=1 determine whether $n_{s,k}$=1 is satisfied. If it is satisfied, goto step 3); else goto step 5). On contrary, when k≠1, goto step 6).

3) In this case, the starting region of the toolpath belongs to the feedrate-sensitive region. Calculate the required displacement $s_{req}(0, \dot{s}_{o,k})$ of the acceleration process from 0 to $\dot{s}_{o,k}$ using Eq. (8), and the arc length of this sensitive region which is denoted as $l_k$ using Eq. (10), If $s_{req}(0, \dot{s}_{o,k}) \leq l_k/2$, goto step 4); else, find a speed value $\dot{s}_{F,k}$ to meet $s_{req}(\dot{s}_{F,k}, 0) = l_k/2$ using dichotomy method between 0 and $\dot{s}_{o,k}$. Then, update the allowable speed value $\dot{s}_{o,k}$ of this feedrate-sensitive region by letting $\dot{s}_{o,k}=\dot{s}_{F,k}$ and recalculate $s_{req}(0, \dot{s}_{o,k})$; after that, goto step 4).

4) When the starting region of the toolpath belongs to the feedrate-sensitive region, the initial acceleration process must be executed within the sensitive region. Therefore, it is necessary to determine whether the axial drive constraints are exceeded when performing acceleration within the first sensitive region. Calculate the number of discretized points of the initial acceleration process, denoted as $n_b$, by $$n_b = \text{int}\left(\frac{s_{req}(0, \dot{s}_{o,k})}{\delta_d}\right) \quad (16)$$

According to the relationship between displacement and tangential speed, acceleration, and jerk of the S-shape acceleration/deceleration mode, reversely solve the tool-tip speed $\dot{s}_{b,j}$, the tangential acceleration $\ddot{s}_{b,j}$, and the tangential jerk $\dddot{s}_{b,j}$ (j∈{1, . . . , $n_b$}) within the acceleration process in the first feedrate-sensitive region. Then solve the request axial speed $\dot{q}_{b,j}$, the axial acceleration $\ddot{q}_{b,j}$, and the axial jerk $\dddot{q}_{b,j}$ (j∈{1, . . . , $n_b$}) at each discretized point within the acceleration process of the first feedrate-sensitive region by substituting $\dot{s}_{b,j}$, $\ddot{s}_{b,j}$, and $\dddot{s}_{b,j}$ to Eq. (4). Finally, calculate the minimum ratio $K_b$ between the axial drive limitations and the request axial drive parameters by $$K_b = \min\left(\min\left(\left|\frac{\dot{q}_{max}(i)}{\dot{q}_{b,j}(i)}\right|\right), \min\left(\sqrt{\left|\frac{\ddot{q}_{max}(i)}{\ddot{q}_{b,j}(i)}\right|}\right), \min\left(\sqrt[3]{\left|\frac{\dddot{q}_{max}(i)}{\dddot{q}_{b,j}(i)}\right|}\right)\right), \quad (17)$$
$$i \in \{1, \ldots, 5\}, j \in \{1, \ldots, n_b\}$$

By comparing $K_b$ and 1, determine a tuning ratio for the tangential speed, acceleration, and jerk in the acceleration process of the first federate-sensitive region, denoted as $K_{b,t}$ by the following equation:

$$K_{b,t} = \min(K_b, 1) \quad (18)$$

Let the tangential acceleration constraint of the acceleration process in the first federate-sensitive region $\alpha_{b,max} = K_{b,t}^2 \cdot \alpha_{b,max}$, and the tangential jerk constraint of the deceleration process in the first federate-sensitive region $j_{b,max} = K_{b,t}^3 \cdot j_{t,max}$. Then update the allowable speed value corresponding to the first feedrate-sensitive region by letting $\dot{s}_{o,k} = K_{b,t} \cdot \dot{s}_{o,k}$.

5) When k=1 and $n_{s,k} \neq 1$ which indicating that there exists feedrate-non-sensitive region between the start point on the toolpath and the first sensitive region, schedule an acceleration process within this non-sensitive region. Calculate the required displacement $s_{req}(0, \dot{s}_{o,k})$ of the acceleration process from 0 to $\dot{s}_{o,k}$ using Eq. (8), and the arc length $l_{r,k}$ of this first non-sensitive region by Eq, (15).

If $s_{req}(0, \dot{s}_{o,k}) > l_{r,k}$, find a speed value $\dot{s}_{F,k}$ to meet $s_{req}(0, \dot{s}_{o,k}) = l_{r,k}$ using dichotomy method between 0 and $\dot{s}_{o,k}$. Then, update the allowable speed value $\dot{s}_{o,k}$ of this feedrate-sensitive region by letting $\dot{s}_{o,k} = \dot{s}_{F,k}$ and goto step 7).

6) Evaluate whether it is an acceleration procedure. If $\dot{s}_{o,k} \geq \dot{s}_{o,k+1}$ is satisfied, indicating that it is an deceleration procedure, goto step 7); else, calculate the required displacement $s_{req}(\dot{s}_{o,k}, \dot{s}_{o,k+1})$ of the acceleration process from $\dot{s}_{o,k}$ to $\dot{s}_{o,k+1}$, and the arc length $l_{r,k}$ of the k-th non-sensitive region.

If $s_{req}(\dot{s}_{o,k}, \dot{s}_{o,k+1}) > l_{r,k}$, find a speed value $\dot{s}_{F,k}$ to meet $s_{req}(\dot{s}_{o,k}, \dot{s}_{o,k+1}) = l_{r,k}$ using dichotomy method between 0 and $\dot{s}_{o,k}$. Then, update the allowable speed value $\dot{s}_{o,k}$ of this feedrate-sensitive region by letting $\dot{s}_{o,k} = \dot{s}_{F,k}$ and goto step 7).

7) If k=$N_{sr}$−1, goto step 8); Else, let k=k+1 and goto step 2).

8) When $n_{e,k} = N_d$ and $K_{f,t} < 1$, judge whether the allowable speed $\dot{s}_{o,k}$ corresponding to $N_{sr}$-th feedrate-sensitive region is updated by acceleration-procedure speed scheduling or not. If yes, calculate the ratio $K_{ba}$ between the speed value after and before updating, and let $K_{f,t} = K_{ba} \cdot K_{f,t}$. Then update the tangential acceleration constraint of the deceleration process in $N_{sr}$-th feedrate-sensitive region by $\alpha_{f,max} = K_{f,t}^2 \cdot \alpha_{t,max}$, and the tangential jerk constraint of the deceleration process in $N_{sr}$-th feedrate-sensitive region by $j_{f,max} = K_{f,t}^3 \cdot j_{t,max}$. Thus, end the bi-directional scanning.

After above backward scanning speed scheduling for deceleration procedure and forward scanning speed scheduling for acceleration procedure, the final obtained $\dot{s}_{o,k}$ is thus the final axial-drive-constraint limited speed value corresponding to k-th feedrate-sensitive region.

Step Four: Calculation of the acceleration/deceleration-start-point parameters and their corresponding speed values First, determine whether the arc length $l_{r,k}$ of the non-sensitive region is long enough for acceleration from the allowable speed $\dot{s}_{o,k}$ of the k-th sensitive region to the programmed maximum tool-tip motion speed $v_{max}$ and then deceleration to the allowable speed $\dot{s}_{o,k+1}$ of the (k+1)-th sensitive region. Videlicet judge if the inequation (19) is satisfied.

$$l_{r,k} > s_{req}(\dot{s}_{o,k}, v_{max}) + s_{req}(v_{max}, \dot{s}_{o,k+1}) \quad (19)$$

Once Eq. (19) can be satisfied, perform acceleration from $\dot{s}_{o,k}$ to $v_{max}$ and deceleration from $v_{max}$ to $\dot{s}_{o,k+1}$ processes between the kth and (k+1)th sensitive regions in sequence. The acceleration-start-point parameter is $u_{e,k}$, and the corresponding feedrate is $\dot{s}_{o,k}$. In addition, the deceleration-start-point parameter $u_{dc}$ is computed as $$\begin{cases} n_{dp} = \text{int}\left(\frac{s_{req}(v_{max}, \dot{s}_{o,k+1})}{\delta_d}\right) \\ n_{dc} = n_{s,k+1} - n_{dp} \\ l_{dc} = s_{req}(v_{max}, \dot{s}_{o,k+1}) - \delta_s \cdot n_{dp} \\ u_{dc} = u_{d,n_{dc}} - \frac{1}{\|C_P'(u_{d,n_{dc}})\|} l_{dc} - \frac{C_P'(u_{d,n_{dc}}) \cdot C_P''(u_{d,n_{dc}})}{2\|C'(u_{d,n_{dc}})\|^4} l_{dc}^2 \end{cases} \quad (20)$$

The feedrate corresponding to the deceleration-start point is $v_{max}$.

On contrary, if Eq. (19) cannot be satisfied, perform acceleration or deceleration merely between the kth and (k+1)th sensitive regions in order to keep a smooth and stable tool-tip motion. If $\dot{s}_{o,k} \leq \dot{s}_{o,k+1}$ execute the acceleration process. The acceleration-start-point parameter is $u_{e,k}$ and the corresponding feedrate is $\dot{s}_{o,k}$. If $\dot{s}_{o,k} > \dot{s}_{o,k+1}$, execute the deceleration process. The deceleration-start-point parameter $u_{dc}$ is calculated using the following equation.

$$\begin{cases} n_{dp} = \text{int}\left(\dfrac{s_{req}(\dot{s}_{o,k}, \dot{s}_{o,k+1})}{\delta_d}\right) \\ n_{dc} = n_{s,k+1} - n_{dp} \\ l_{dc} = s_{req}(\dot{s}_{o,k}, \dot{s}_{o,k+1}) - \delta_s \cdot n_{dp} \\ u_{dc} = u_{d,n_{dc}} - \dfrac{1}{\|C'_p(u_{d,n_{dc}})\|} l_{dc} - \dfrac{C'_p(u_{d,n_{dc}}) \cdot C''_p(u_{d,n_{dc}})}{2\|C'(u_{d,n_{dc}})\|^4} l_{dc}^2 \end{cases} \quad (21)$$

The feedrate corresponding to this deceleration-start point is $\dot{s}_{o,k}$.

After above computation, denote the total amount of the obtained acceleration/deceleration-start points as n and the set consisted by the acceleration/deceleration-start-point parameters and the corresponding feedrates as $\{ur_i, vu_i\}$, $i=1, 2, \ldots, n$, where $ur_i$ is the i-th acceleration/deceleration-start-point parameter, and $vu_i$ is the i-th acceleration/deceleration-start-point speed.

Step Five: Real-time calculation of interpolation-point parameter and feedrate

In real-time interpolation, judge which one of the parameter range $[ur_i, ur_{i+1}]$ that the current interpolation-point parameter $u_j$ lays in, and then calculate $t_1$, $t_2$, and $t_3$:

$$t_1 = \begin{cases} \dfrac{a_{t,m}}{j_{t,m}} & |vu_{i+1} - vu_i| > \dfrac{a_{t,m}^2}{j_{t,m}} \\ \sqrt{\dfrac{|vu_{i+1} - vu_i|}{j_{t,m}}}, & |vu_{i+1} - vu_i| \leq \dfrac{a_{t,m}^2}{j_{t,m}} \end{cases} \quad (22)$$

$$t_2 = \begin{cases} \dfrac{|vu_{i+1} - vu_i| - a_{t,m}^2/j_{t,m}}{a_{t,m}}, & |vu_{i+1} - vu_i| > \dfrac{a_{t,m}^2}{j_{t,m}} \\ 0, & |vu_{i+1} - vu_i| \leq \dfrac{a_{t,m}^2}{j_{t,m}} \end{cases}$$

$$t_3 = t_1$$

where when $i=1$, $\alpha_{t,m} = \alpha_{b,max}$ and $j_{t,m} = j_{b,max}$; when $i=n$, $\alpha_{t,m} = \alpha_{f,max}$ and $j_{t,m} = j_{f,max}$; otherwise, $\alpha_{t,m} = \alpha_{t,max}$ and $j_{t,m} = j_{t,max}$.

When the elapsed time after the interpolation-point parameter passes into the current range t is smaller than $t_1 + t_2 + t_3$, the feedrate $v_j$ for current interpolation point is:

$$v_j = \begin{cases} vu_i + \dfrac{1}{2} j_{t,m} t^2, & 0 \leq t < t_1 \\ v_1 + a_m(t - t_1), & t_1 \leq t < t_1 + t_2 \\ v_1 = vu_i + \dfrac{1}{2} j_{t,m} t_1^2, \\ v_2 + a_m(t - t_1 - t_2) - & v_2 = v_1 + a_m t_2, t_1 + \\ \dfrac{1}{2} j_{t,m}(t - t_1 - t_2)^2, & t_2 \leq t \leq t_1 + t_2 + t_3 \end{cases} \quad (23)$$

where $\alpha_m = j_{f,max} \cdot t_1$. Otherwise, when $t \geq t_1 + t_2 + t_3$, the current point feedrate $v_j = vu_{i+1}$. Calculate the next interpolation-point parameter $u_{j+1}$ according to the second-order Taylor's expansion method as:

$$u_{j+1} = u_j + \dfrac{v_j}{\|C'_p(u_j)\|} T - \dfrac{v_j^2 (C'_p(u_j), C''_p(u_j))}{2\|C'_p(u_j)\|^4} T^2 \quad (24)$$

where T is the interpolation period. Judge whether the ending point of the curve is reached, and if yes, end the interpolation; else, let $j = j+1$ and back to the beginning of Step Five. Hence, the feedrate scheduling with axial drive constraints for five-axis dual-spline interpolation can be realized.

The beneficial effects of the invented method are summarized below. This method is a feedrate-scheduling method with axial drive constraints for five-axis dual-spline interpolation, so that a smooth feedrate profile for the tool-tip motion can be fast generated according to axial velocity, acceleration, and jerk constraints. This method provide constant speed at feedrate-sensitive regions, so that not only overall iteration is of no need, but also motion stability and efficiency can be harmonized with a high computation efficiency. This method can effectively balance the machining quality and efficiency in five-axis machining, and the computation burden is relatively low, which means a preferable real-time capability.

INSTRUCTION FIGURES

Figure 4:
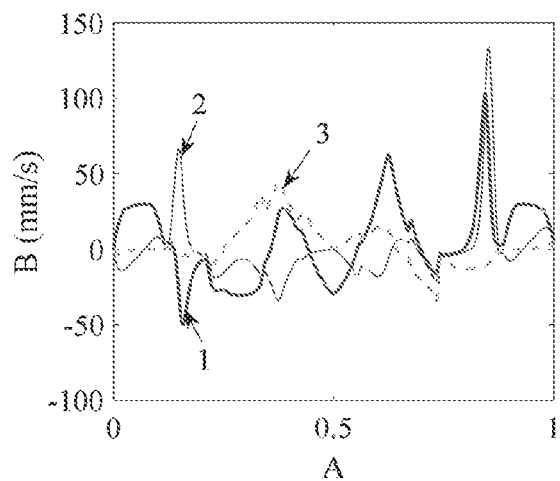

FIG. 1: Overall flow diagram of the invented method;

FIG. 2: Geometric model of five-axis dual-spline curve toolpath in Cartesian coordinate system, where curve 1 means the tool-tip motion path, and curve 2 means the second-point motion path;

FIG. 3: Scheduled tool-tip motion feedrate, where A axis means spline parameter, and B axis means tool-tip motion speed with the unit of mm/s;

FIG. 4: Actual motion velocities of translational axes, where A and B axes mean the spline parameter and the velocity value with the unit of mm/s, respectively, and curves 1, 2, and 3 mean X-axis, Y-axis, and Z-axis velocities, respectively.

Figure 5:
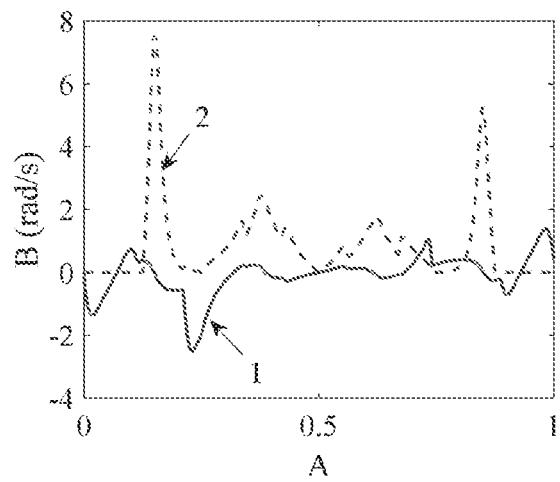

FIG. 5: Actual motion velocities of rotary axes, where A and B axes mean the spline parameter and the velocity value with the unit of rad/s, respectively; and curves 1 and 2 mean A-axis and C-axis velocities, respectively.

Figure 6:
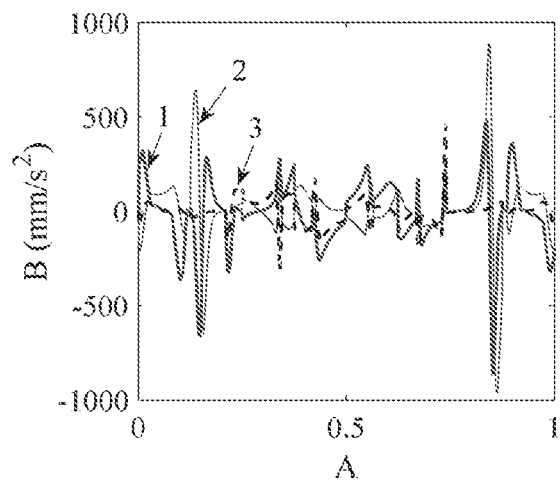

FIG. 6: Actual motion accelerations of translational axes, where A and B axes mean the spline parameter and the acceleration value with the unit of mm/s², respectively, and curves 1, 2, and 3 mean X-axis, Y-axis, and Z-axis accelerations, respectively.

Figure 7:
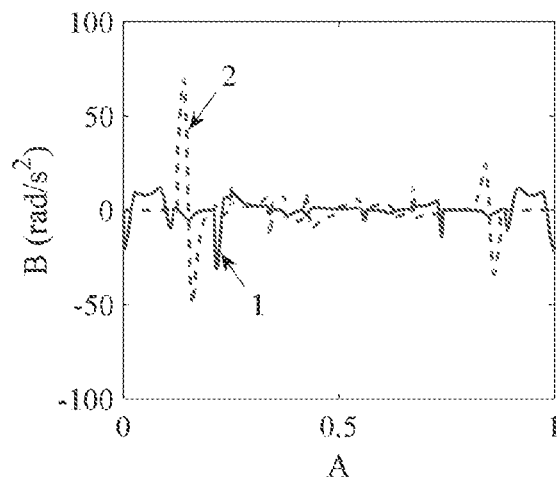

FIG. 7: Actual motion accelerations of rotary axes, where A and B axes mean the spline parameter and the acceleration value with the unit of rad/s², respectively, and curves 1 and 2 mean A-axis and C-axis accelerations, respectively.

Figure 8:
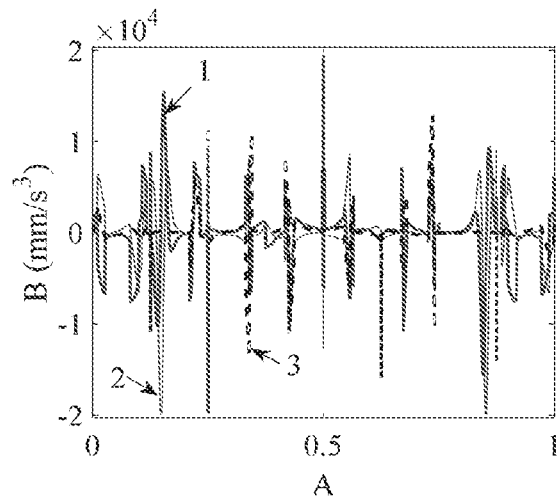

FIG. 8: Actual motion jerks of translational axes, where A and B axes mean the spline parameter and the jerk value with the unit of mm/s³, respectively, and curves 1, 2, and 3 mean X-axis, Y-axis, and Z-axis jerks, respectively.

Figure 9:
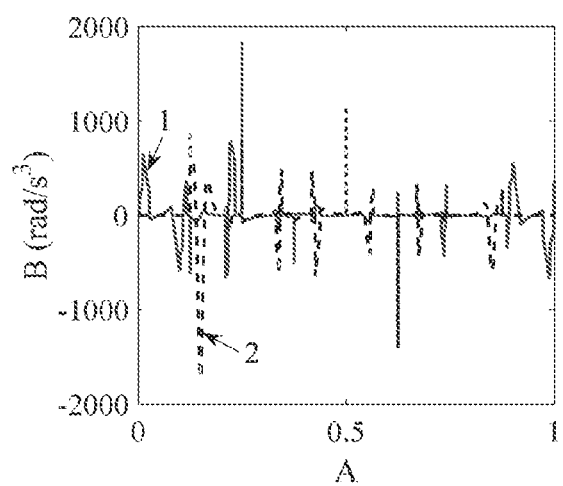

FIG. 9: Actual motion jerks of rotary axes, where A and B axes mean the spline parameter and the jerk value with the unit of rad/s², respectively, and curves 1 and 2 mean A-axis and C-axis jerks, respectively.

SPECIFIC IMPLEMENTATION EXAMPLE

The specific implementation procedure of the invention is described in detail with an example in combination with the technical scheme and attached figures.

During five-axis dual-spline interpolation, the feedrate scheduling is a tough challenge due to the nonlinear relationship between tool-tip and tool-orientation motions and the joint-axis motion. To deal with this problem thus realizing high-efficiency feedrate scheduling and improving the five-axis machining quality, this invention provides a feedrate-scheduling method for five-axis dual-spline interpolator.

FIG. 1 is the overall flow diagram of the invented method. FIG. 2 is the geometric model of five-axis dual-spline curve toolpath in Cartesian coordinate system. By taking the toolpath shown in FIG. 2 as an instance, the detail implementation procedure is illustrated as follows. The curve 1 is the tool-tip motion spline, and its spline parameters are:

Order: 2;
Control points: {(0, 0, 0), (5, −5, −2), (10, 0, 0), (0, 20, 2), (10, 30, 5), (30, 30, 5), (40, 20 2), (30, 0, 0), (35, −5, −2), (40, 0, 0)};
Weights: {1; 0.5; 2; 1; 2; 2; 1; 2; 0.5; 1};
Knot vector: {0, 0, 0, ⅛, 2/8, ⅜, 4/8, ⅝, 6/8, ⅞, 1, 1, 1}.

In addition, the order, weights and knot vector of the curve 2 are the same with those of curve 1, and the control points of the curve 2 are {(0, 0, 2), (5, −6, 0), (10, 0, 2), (−5, 20, 4), (10, 33, 7), (30, 33, 7), (45, 20, 4), (30, 0, 2), (35, −6, 0), (40, 0, 2)}.

Schedule the five-axis dual-spline interpolation feedrate according to the procedure shown in FIG. 1, by taking the AC double-rotary-table five-axis machine tool as an example. The detail procedure is as follows, First, establish the relationship between axial motion and tool-tip motion. Discretize the curve 1 shown in FIG. 2 with equal arc length using Eq. (1) by setting the arc-length step as $\delta_s$=0.05 mm. Calculate the tool tip and tool orientation using Eq. (2) thus obtaining the axial position vector q according to the inverse kinematics of the double-rotary-table five-axis machine tool. Calculate the first-to-third-order derivatives $q_s$, $q_{ss}$, and $q_{sss}$ of the axial motion position with respect to arc length according to Eq. (3).

Second, determine the feedrate-sensitive regions, Calculate the relation between axial velocity acceleration, and jerk vectors $\dot{q}$, $\ddot{q}$, and $\dddot{q}$ and $q_s$, $q_{ss}$, and $q_{sss}$ according to Eq. (4). Set the X-axis, Y-axis, and Z-axis velocity constraints as 300 mm/s, the acceleration constraints as 1000 mm/s², the jerk constraints as 20000 mm/s³. Additionally, set the A-axis and C-axis velocity constraints as 30 rad/s, the acceleration constraints as 100 rad/s², and the jerk constraints as 2000 rad/s³. The constraints are summarized as $\dot{q}_{max}$=[300, 300, 300, 30, 30]$^T$, $\ddot{q}_{max}$=[1000, 1000, 1000, 100, 100]$^T$, and $\dddot{q}_{max}$=[20000, 20000, 20000, 2000, 2000]$^T$. Set the reference tool-tip speed as $v_{max}$=30 mm/s. Calculate the parameter sets of the feedrate-sensitive regions coupled with the tangential drive constraints $\alpha_{t,max}$ and $j_{t,max}$ according to the axial drive constraints.

Third, calculate the allowable feed speed of each feedrate-sensitive region. The initial sensitive-region speed value $\dot{s}_o$ is calculated using Eq. (7) according to axial drive constraints. The final sensitive-region speed values are then obtained by bi-directional scanning updating of the $\dot{s}_o$ according to the tangential acceleration and jerk constraints. At the same time, compute the acceleration limitation $\alpha_{b,max}$ of the initial acceleration procedure, the jerk limitation $j_{b,max}$ of the initial acceleration procedure, the acceleration limitation $\alpha_{f,max}$ of the final deceleration procedure, and the jerk limitation $j_{f,max}$ of the final deceleration procedure.

Fourth, calculation of the acceleration/deceleration-start-point parameters and the corresponding speed values. According to the instruction of "Step Four" in the contents of invention, compute the set of acceleration/deceleration-start-point parameters and their corresponding speed values, i.e. {$ur_i$, $vu_i$}, i=1, 2, . . . , n.

Fifth, calculation of the interpolation-point feedrate and parameter. Judge the parameter range that the current interpolation point belongs to, and then calculate the current point feedrate according to the instruction of "Step Four" in the contents of invention. Thus calculate the next-point parameter according to Eq. (24). Judge whether the end of the curve is reached, and if it is not reached, return to calculate the next-point feedrate, otherwise end the algorithm if it is reached.

FIG. 3 illustrates the scheduled tool-tip feedrate using the above steps, where A and B axes stands for the spline parameter and the tool-tip feedrate with the unit of mm/s, respectively. It can be seen from FIG. 3 that the scheduled five-axis dual-spline interpolation feedrate keeps constant except for partial of the non-sensitive regions where execute smooth transitions, which is beneficial to the motion stability and efficiency.

FIG. 4 illustrates the obtained actual three translational axes velocities when using the scheduled feedrate, where A and B axes mean the spline parameter and the velocity value with the unit of mm/s, respectively, and curves 1, 2, and 3 mean X-axis, Y-axis, and Z-axis velocities, respectively. As can be seen in this figure, the translational axes velocities are all less than the set constraints of 300 mm/s.

FIG. 5 illustrates the obtained actual velocities of two rotary axes when using the scheduled feedrate, where A and B axes mean the spline parameter and the velocity value with the unit of rad/s, respectively, and curves 1 and 2 mean A-axis and C-axis velocities, respectively. As can be seen in this figure, actual rotary axes velocities are all less than the set constraints of 30 rad/s.

FIG. 6 illustrates the obtained actual accelerations of three translational axes when using the scheduled feedrate, where A and B axes mean the spline parameter and the acceleration value with the unit of mm/s², respectively, and curves 1, 2, and 3 mean X-axis, Y-axis, and Z-axis accelerations, respectively. As can be seen in this figure, actual translational axes accelerations are all less than the set constraints of 1000 mm/s².

FIG. 7 illustrates the obtained actual accelerations of two rotary axes when using the scheduled feedrate, where A and B axes mean the spline parameter and the acceleration value with the unit of rad/s², respectively, and curves 1 and 2 mean A-axis and C-axis accelerations, respectively. As can be seen in this figure that actual rotary axes accelerations are all less than the set constraints of 100 rad/s².

FIG. 8 illustrates the obtained actual jerks of three translational axes when using the scheduled feedrate, where A and B axes mean the spline parameter and the jerk value with the unit of mm/s³, respectively, and curves 1, 2, and 3 mean X-axis, Y-axis, and Z-axis jerks, respectively. As can be seen from this figure that actual translational axes jerks are all less than the set constraints of 20000 mm/s².

FIG. 9 illustrates the actual jerks of two rotary axes when using the scheduled feedrate, where A and B axes mean the spline parameter and the jerk value with the unit of rad/s², respectively, and curves 1 and 2 mean A-axis and C-axis jerks, respectively. As can be seen from this figure that actual rotary axes jerks are all less than the set constraints of 2000 rad/s³.

To sum up, the scheduled five-axis dual-spline interpolation feedrate can keep constant in most regions of the whole spline, and all of the axial drive constraints can be effectively satisfied. The invented feedrate scheduling method with constant speed at feedrate-sensitive regions under axial drive constraints can make a balance between the motion stability and efficiency during five-axis machining, thus improving the performance of the five-axis numerical control machine tools.

We claim:

1. A feedrate scheduling method for five-axis dual-spline curve interpolation; Its characteristic is that the relationship between the axial motion and tool-tip motion is obtained by computation of the first, second and third-order derivatives of the axial positions with respect to the arc-length parameter based on tool-tip motion spline equal-arc-length discretization, and the feedrate-sensitive regions are determined with axial drive constraints and the machining quality and efficiency balancing objective; After that, determine the speed values of federate-sensitive regions and acceleration/deceleration-start-point curve parameters by bi-direction scanning; Finally, the constant speed values are adopted within feedrate-sensitive regions, and S-shape acceleration/deceleration mode is used to schedule the smooth speed within non-sensitive regions; The detail procedure of the method is as follows:

Step One: Establish the relationship between the axial motion and the tool-pose trajectory;

Denote the tool-tip motion spline equation of the dual-NURBS curve to be interpolated as $C_P=C_P(u)$, and the motion spline of second-point on the tool axis except the tool tip as $C_Q=C_Q(u)$; First, discretize the tool-tip motion spline with equal arc length; Denote the arc-length step as $\delta_s$, and the ith discrete point parameter after discretization as $u_{d,i}$, thus by using the second-order Taylor expansion, the (i+1)th point parameter $u_{d,i+1}$ can be computed as Eq (1):

$$u_{d,i+1} = u_{d,i} + \frac{1}{\|C'_P(u_{d,i})\|}\delta_s - \frac{C'_P(u_{d,i}) \cdot C''_P(u_{d,i})}{2\|C'(u_{d,i})\|^4}\delta_s^2 \quad (1)$$

where $\|\ \|$ stands for the Euclidean norm, additionally, $C'_P(u_{d,i})$ and $C''_P(u_{d,i})$ are the first and second order derivatives of $C_P(u)$ with respect to u at $u_{d,i}$;

Denote the tool tip and the tool-axis vector as $R=[R_x, R_y, R_z]^T$ and $O=[O_x, O_y, O_z]^T$, respectively; After obtaining of the disc e-point parameters $u_{d,i}$, i=1, 2, ..., $N_d$ ($N_d$ is the total amount of discrete points), compute the i-th tool tip $R_i=[R_{x,i}, R_{y,i}, R_{z,i}]^T$ and tool-orientation vector $O_i=[O_{x,i}, O_{y,i}, O_{z,i}]^T$ corresponding to i-th discrete point as:

$$\begin{cases} R_i = C_P(u_{d,i}) \\ O_i = \dfrac{C_Q(u_{d,i}) - C_P(u_{d,i})}{\|C_Q(u_{d,i}) - C_P(u_{d,i})\|} \end{cases} \quad (2)$$

Then, calculate the five joint-axis positions according to the obtained tool tip and tool orientation of Eq. (2) using inverse kinematics of five-axis machine tools, which are denoted in one vector q with five elements corresponding to the five physical axes of the machine tool, respectively; Denote ith joint-axis motion position vector corresponding to i-th tool tip and i-th tool vector as $q_i$, thus, the first-to-third-order derivatives of the physical axial positions with respect to the tool-tip trajectory arc-length parameter can be calculated as:

$$\begin{cases} q_{s,i} = \dfrac{q_{i+1} - q_{i-1}}{2\delta_s} \\ q_{ss,i} = \dfrac{q_{s,i+1} - q_{s,i-1}}{2\delta_s} \\ q_{sss,i} = \dfrac{q_{ss,i+1} - q_{ss,i-1}}{2\delta_s} \end{cases} \quad (3)$$

where $q_{s,i}$, $q_{ss,i}$, and $q_{sss,i}$ are first-order, second-order, and third-order derivatives of the physical axial positions with respect to the tool-tip trajectory arc-length parameter, respectively; The Eq. (3) expresses the relationship between the axial motion and the tool-pose motion;

Step Two: Determination of the feedrate-sensitive regions

According to the principle of differentiation, the relationship between axial and tool-tip motion velocity, acceleration, and jerk can be derived as:

$$\begin{cases} \dot{q} = q_s \dot{s} \\ \ddot{q} = q_{ss}\dot{s}^2 + q_s \ddot{s} \\ \dddot{q} = q_{sss}\dot{s}^3 + 3q_{ss}\dot{s}\ddot{s} + q_{ss}\dddot{s} \end{cases} \quad (4)$$

where $\dot{q}$, $\ddot{q}$, and $\dddot{q}$ are first, second, and third order derivatives of axial motion position with respect to time, i.e. axial velocity, acceleration, and jerk vectors, respectively; in addition, $\dot{s}$, $\ddot{s}$, and $\dddot{s}$ are first, second, and third order derivatives of tool-tip motion position with respect to time, i.e. tool-tip velocity; tangential acceleration, and jerk, respectively;

Denote the physical axial velocity constraint, acceleration constraint, and jerk constraint as $\dot{q}_{max}$, $\ddot{q}_{max}$, and $\dddot{q}_{max}$, respectively, and the reference tool-tip motion speed constraint as $v_{max}$; First, let the tool-tip motion acceleration constraint $\alpha_{t,max}$ be the minimum value of the translational axes acceleration constraints in $\ddot{q}_{max}$, and let the tool-tip motion jerk constraint $j_{t,max}$ be the minimum value of the translational axes jerk constraints in $\dddot{q}_{max}$; Then, aiming at balancing the machining efficiency and motion stability, optimize $\alpha_{t,max}$ and $j_{t,max}$ so as to determine the feedrate-sensitive regions which are defined as the areas where the axial velocity, acceleration, and jerk can be exceeded when maximum tool-tip speed, acceleration, and jerk are utilized; According to Eq. (4), it has $$\begin{cases} |\dot{q}| = |q_s||\dot{s}| \le |q_s|v_{max} \\ |\ddot{q}| \le |q_{ss}|\dot{s}^2 + |q_s||\ddot{s}| \le |q_{ss}|v_{max}^2 + |q_s|a_{t,max} \\ |\dddot{q}| \le |q_{sss}|\|\dot{s}\|^3 + 3|q_{ss}|\|\dot{s}\|\|\ddot{s}\| + |q_{ss}||\dddot{s}| \le |q_{sss}|v_{max}^3 + \\ 3|q_{ss}|v_{max}a_{t,max} + |q_{ss}|j_{t,max} \end{cases} \quad (5)$$

Hereby, the discretized position where one of the inequations $|q_{s,i}|v_{max}>\dot{q}_{max}$, $|q_{ss,i}|v_{max}^2+|q_{s,i}|\alpha_{t,max}>\ddot{q}_{max}$, and $|q_{sss,i}|v_{max}^3+3|q_{ss,i}|v_{max}\alpha_{t,max}+|q_{ss,i}|j_{t,max}>\dddot{q}_{max}$ can be satisfied is determined as the point inside the feedrate-sensitive regions; Denote the total number of the sensitive regions as $N_{sr}$, and the sequence number of the discretized points corresponding to the start and end position of kth sensitive region as $n_{s,k}$ and $n_{e,k}$, respectively, thus the feedrate-sensitive regions can be expressed by discretized-point sequence number sets as $\{[n_{s,k}, n_{e,k}]\}$, k=1, 2, ..., $N_{sr}$; Hence, the total arc length $l_{sr}$ of the feedrate-sensitive regions on the tool-tip motion trajectory can be calculated by:

$$l_{sr} = \delta_d \cdot \sum_{k=1}^{N_{sr}} (n_{e,k} - n_{s,k}) \quad (6)$$

The total arc length of the tool-tip motion spline is denoted as $l_t$; If $l_{sr} < l_t/2$, indicating that most of the areas on the toolpath belong to feedrate-sensitive regions, where the maximum speed $v_{max}$ can be adopted, therefore, the motion stability and efficient machining can be simultaneously ensured, and the scheduled federate-sensitive regions are satisfactory; Otherwise, if $l_{sr} > l_t/2$, indicating that most areas on the toolpath belong to feedrate-non-sensitive regions, where the minimum allowable speed values within the corresponding regions should be used, thus the efficiency will be low although the motion stability is permissible; Therefore, the $\alpha_{t,max}$ and $j_{t,max}$ values are optimized in this case, so as to optimize the feedrate-sensitive regions; The optimization procedure is to find tangential acceleration and jerk constraints between zero and original $\alpha_{t,max}$ and $j_{t,max}$ by using bisection method, so as to make the total arc length of sensitive regions $l_{sr}$ happens to be half of the arc length of the whole toolpath $l_t$, i.e. $l_{sr}=l_t/2$; Finally, the parameter set of the obtained feedrate-sensitive regions is expressed as $\{[u_{s,k}, u_{e,k}]\}$, k=1, 2, ..., $N_{sr}$;

Step Three: Calculation of the allowable speed of each feedrate-sensitive region First, determine the initial constant speed of each feedrate-sensitive region according to axial drive constraints; in order to make a balance between motion stability and efficiency, constant speed is scheduled inside each feedrate-sensitive region, and in this circumstance, the tangential acceleration $\ddot{s}$ and jerk $\dddot{s}$ are all zeros; According to Eq. (4), the initial constant speed value $\dot{s}_{o,k}$ for kth feedrate-sensitive region can be derived as:

$$\dot{s}_{o,k} = \min\left(\min\left(\frac{\dot{q}_{max}(j)}{q_{s,i}(j)}\right), \min\left(\sqrt{\frac{\ddot{q}_{max}(j)}{q_{ss,i}(j)}}\right), \min\left(\sqrt[3]{\frac{\dddot{q}_{max}(j)}{q_{sss,i}(j)}}\right)\right), \quad (7)$$

$$i \in \{n_{s,k}, ..., n_{e,k}\}, j \in \{1, ..., 5\}$$

where min( ) means the minimum function;

Then, update the speed values of feedrate-sensitive regions with tangential acceleration and jerk constraints in S-shape acceleration/deceleration mode; When the tangential acceleration and jerk constraints are $\alpha_{t,max}$ and $j_{t,max}$, respectively, the required displacement $s_{req}(\dot{s}_{start}, \dot{s}_{end})$ from starting velocity $\dot{s}_{start}$ to ending velocity $\dot{s}_{end}$ in S-shape acceleration/deceleration mode is calculated by:

$$s_{req}(v_{start}, v_{end}) = \quad (8)$$

$$\begin{cases} \dot{s}_{start}(t_1+t_2+t_3) + \frac{1}{2}j_{t,max}t_1^2(t_2+t_3) + \frac{1}{2}a_{max}(t_2^2+t_3^2) + a_{max}t_2t_3, \\ \qquad v_{start} < v_{end} \\ \dot{s}_{start}(t_1+t_2+t_3) - \frac{1}{2}j_{t,max}t_1^2(t_2+t_3) - \frac{1}{2}a_{max}(t_2^2+t_3^2) - a_{max}t_2t_3, \\ \qquad v_{start} > v_{end} \end{cases}$$

where the maximum acceleration $\alpha_{max}=j_{t,max}t_1$, increase acceleration/deceleration time $t_1$, constant acceleration/deceleration time $t_2$ and decrease acceleration/deceleration time $t_3$ are calculated as:

$$t_1 = \begin{cases} \frac{a_{t,max}}{j_{t,max}}, & |\dot{s}_{end} - \dot{s}_{start}| > \frac{a_{t,max}^2}{j_{t,max}} \\ \sqrt{\frac{|\dot{s}_{end} - \dot{s}_{start}|}{j_{t,max}}}, & |\dot{s}_{end} - \dot{s}_{start}| \leq \frac{a_{t,max}^2}{j_{t,max}} \end{cases} \quad (9)$$

$$t_2 = \begin{cases} \frac{|\dot{s}_{end} - \dot{s}_{start}| - a_{t,max}^2/j_{t,max}}{a_{t,max}}, & |\dot{s}_{end} - \dot{s}_{start}| > \frac{a_{t,max}^2}{j_{t,max}} \\ 0, & |\dot{s}_{end} - \dot{s}_{start}| \leq \frac{a_{t,max}^2}{j_{t,max}} \end{cases}$$

$$t_3 = t_1$$

The feedrate-sensitive region speed value $\dot{s}_{o,k}$ is updated by bi-directional scanning, and the detail procedure is given below;

At first, backward scanning from $k=N_{sr}$ to $k=1$ for scheduling of the deceleration procedure speed; The procedure is:

1) Let $k=N_{sr}$;
2) When $k=N_{sr}$, determine whether $n_{e,k}=N_d$ is satisfied or not, and if $n_{e,k}=N_d$, goto step 3); else goto step 5); On contrary, when $k \neq N_{sr}$, goto step 6);
3) In this case, the ending region of the toolpath belongs to the feedrate-sensitive region; Calculate the required displacement $s_{req}(\dot{s}_{o,k}, 0)$ of deceleration process from $\dot{s}_{o,k}$ to 0 using Eq. (8), and the arc length of this sensitive region which is denoted as $l_k$:

$$l_k = \delta_d \cdot (n_{e,k} - n_{s,k}) \quad (10)$$

If $s_{req}(\dot{s}_{o,k}, 0) \leq l_k/2$, goto step 4); else, find a speed value $\dot{s}_{B,k}$ to meet $s_{req}(\dot{s}_{B,k}, 0)=l_k/2$ using dichotomy method between $\dot{s}_{o,k}$ and 0; Update $\dot{s}_{o,k}$ by letting $\dot{s}_{o,k}=\dot{s}_{B,k}$, and recalculate $s_{req}(\dot{s}_{o,k}, 0)$ then goto step 4);

4) When the ending region of the toolpath belongs to the feedrate-sensitive region, the final deceleration process must be executed within the sensitive region; Therefore, it is necessary to determine whether the axial drive constraints are exceeded when performing deceleration within the last sensitive region; To this end, the number of discretized points of the final deceleration, denoted as $n_f$, is first computed by $$n_f = \text{int}\left(\frac{s_{req}(\dot{s}_{o,k}, 0)}{\delta_d}\right) \quad (11)$$

where int( ) means round down; According to the relationship between displacement and tangential velocity, acceleration and jerk during S-shape acceleration/deceleration process, reversely solve the discretized-point speed $\dot{s}_{f,j}$, tangential acceleration $\ddot{s}_{f,j}$, and tangential jerk $\dddot{s}_{f,j}$ ($j \in \{n_d-n_f, ..., n_d\}$) within the deceleration process of $N_{sr}$-th federate-sensitive region; Then solve the request axial speed $\dot{q}_{f,j}$, the axial acceleration $\ddot{q}_{f,j}$, and the axial jerk $\dddot{q}_{f,j}$ ($j \in \{n_d-n_f, ..., n_d\}$) within the deceleration process of $N_{sr}$-th federate-sensitive region by substituting $\dot{s}_{f,j}$, $\ddot{s}_{f,j}$, and $\dddot{s}_{f,j}$ to Eq. (4); Finally, calculate the minimum ratio $K_f$ between the axial drive limitations and the request axial drive parameters in the final deceleration process by $$K_f = \min\left(\min\left(\left|\frac{\dot{q}_{max}(i)}{\dot{q}_{f,j}(i)}\right|\right), \min\left(\sqrt{\left|\frac{\ddot{q}_{max}(i)}{\ddot{q}_{f,j}(i)}\right|}\right), \min\left(\sqrt[3]{\left|\frac{\dddot{q}_{max}(i)}{\dddot{q}_{f,j}(i)}\right|}\right)\right), \quad (12)$$
$$i \in \{1, \ldots, 5\}, j \in \{n_{s,k}, \ldots, n_{e,k}\}$$

By comparing $K_f$ and 1, determine a tuning ratio for the tangential speed, acceleration, and jerk in the deceleration process of $N_{sr}$-th federate-sensitive region, denoted as $K_{f,t}$, by the following equation:

$$K_{f,t} = \min(K_f, 1) \quad (13)$$

Let the tangential acceleration constraint of the deceleration process of $N_{sr}$-th federate-sensitive region $\alpha_{f,max} = K_{f,t}^2 \cdot \alpha_{t,max}$, and the tangential jerk constraint of the deceleration process of $N_{sr}$-th federate-sensitive region $j_{f,max} = K_{f,t}^3 \cdot j_{t,max}$; Then update the allowable speed value corresponding to $N_{sr}$-th feedrate-sensitive region by letting $\dot{s}_{o,k} = K_{f,t} \cdot \dot{s}_{o,k}$;

5) When $k=N_{sr}$ and $n_{e,k} \neq N_d$, which indicating that there exists feedrate-non-sensitive region between the final point on the toolpath and the last sensitive region, schedule a deceleration process within this non-sensitive region; Calculate the required displacement $s_{req}(\dot{s}_{o,k}, 0)$ of deceleration process from $\dot{s}_{o,k}$ to 0 using Eq. (8), and the arc length $l_f$ of this final non-sensitive region by $$l_f = \delta_d \cdot (N_d - n_{e,k}) \quad (14)$$

If $s_{req}(\dot{s}_{o,k}, 0) > l_{r,k}$, find a speed value $\dot{s}_{B,k}$ to meet $s_{req}(\dot{s}_{B,k}, 0) = l_{r,k}$ using dichotomy method between 0 and $\dot{s}_{o,k}$; Then, update the allowable speed value $\dot{s}_{o,k}$ of this feedrate-sensitive region by letting $\dot{s}_{o,k} = \dot{s}_{B,k}$ and goto step 7);

6) Evaluate whether it is a deceleration procedure; If $\dot{s}_{o,k} \leq \dot{s}_{o,k+1}$ which indicates it is an acceleration process, goto step 7); else, calculate the required displacement $s_{req}(\dot{s}_{o,k}, \dot{s}_{o,k+1})$ of deceleration process from $\dot{s}_{o,k}$ to, and the arc length of the kth feedrate-non-sensitive region $l_{r,k}$:

$$l_{r,k} = \delta_d \cdot (n_{s,k+1} - n_{e,k}) \quad (15)$$

When $s_{req}(\dot{s}_{o,k}, \dot{s}_{o,k+1}) > l_{r,k+1}$, find a speed value $\dot{s}_{B,k}$ to meet $s_{req}(\dot{s}_{o,k}, \dot{s}_{o,k+1}) = l_{r,k+1}$ using dichotomy method between 0 and $\dot{s}_{o,k}$; Then, update the allowable feedrate value $\dot{s}_{o,k}$ of this sensitive region by letting $\dot{s}_{o,k} = \dot{s}_{B,k}$ and goto step 7);

7) if $k=1$, end the backward scanning; else, let $k=k-1$ and goto step 2);

Then, forward scanning from $k=1$ to $k=N_{sr}$ for scheduling of the feedrate-sensitive region speed values of the acceleration procedure;

1) Let $k=1$;
2) When $k=1$, determine whether $n_{s,k}=1$ is satisfied; If it is satisfied, goto step 3); else goto step 5); On contrary; when $k \neq 1$, goto step 6);
3) in this case, the starting region of the toolpath belongs to the feedrate-sensitive region; Calculate the required displacement $s_{req}(0, \dot{s}_{o,k})$ of the acceleration process from 0 to $\dot{s}_{o,k}$ using Eq. (8), and the arc length of this sensitive region which is denoted as $l_k$ using Eq. (10);

If $s_{req}(0, \dot{s}_{o,k}) \leq l_k/2$, goto step 4); else, find a speed value $\dot{s}_{F,k}$ to meet $s_{req}(\dot{s}_{F,k}, 0) = l_k/2$, using dichotomy method between 0 and $\dot{s}_{o,k}$; Then, update the allowable speed value $\dot{s}_{o,k}$ of this feedrate-sensitive region by letting $\dot{s}_{o,k} = \dot{s}_{F,k}$, and recalculate $s_{req}(0, \dot{s}_{o,k})$ after that, goto step 4);

4) When the starting region of the toolpath belongs to the feedrate-sensitive region, the initial acceleration process must be executed within the sensitive region; Therefore, it is necessary to determine whether the axial drive constraints are exceeded when performing acceleration within the first sensitive region; Calculate the number of discretized points of the initial acceleration process, denoted as $n_b$, by $$n_b = \text{int}\left(\frac{s_{req}(0, \dot{s}_{o,k})}{\delta_d}\right) \quad (16)$$

According to the relationship between displacement and tangential speed, acceleration, and jerk of the S-shape acceleration/deceleration mode, reversely solve the tool-tip speed $\dot{s}_{b,j}$, the tangential acceleration $\ddot{s}_{b,j}$, and the tangential jerk $\dddot{s}_{b,j}$ ($j \in \{1, \ldots, n_b\}$) within the acceleration process in the first feedrate-sensitive region; Then solve the request axial speed $\dot{q}_{b,j}$, the axial acceleration $\ddot{q}_{b,j}$, and the axial jerk $\dddot{q}_{b,j}$ ($j \in \{1, \ldots, n_b\}$) at each discretized point within the acceleration process of the first feedrate-sensitive region by substituting $\dot{s}_{b,j}$, $\ddot{s}_{b,j}$, and $\dddot{s}_{b,j}$ to Eq. (4); Finally, calculate the minimum ratio $K_b$ between the axial drive limitations and the request axial drive parameters by $$K_b = \min\left(\min\left(\left|\frac{\dot{q}_{max}(i)}{\dot{q}_{b,j}(i)}\right|\right), \min\left(\sqrt{\left|\frac{\ddot{q}_{max}(i)}{\ddot{q}_{b,j}(i)}\right|}\right), \min\left(\sqrt[3]{\left|\frac{\dddot{q}_{max}(i)}{\dddot{q}_{b,j}(i)}\right|}\right)\right), \quad (17)$$
$$i \in \{1, \ldots, 5\}, j \in \{1, \ldots, n_b\}$$

By comparing $K_b$ and 1, determine a tuning ratio for the tangential speed, acceleration, and jerk in the acceleration process of the first feedrate-sensitive region, denoted as $K_{b,t}$ by the following equation:

$$K_{b,t} = \min(K_b, 1) \quad (18)$$

Let the tangential acceleration constraint of the acceleration process in the first federate-sensitive region $\alpha_{b,max} = K_{b,t}^2 \cdot \alpha_{b,max}$, and the tangential jerk constraint of the deceleration process in the first federate-sensitive region $j_{b,max} = K_{b,t}^3 \cdot j_{t,max}$; Then update the allowable speed value corresponding to the first feedrate-sensitive region by letting $\dot{s}_{o,k} = K_{b,t} \cdot \dot{s}_{o,k}$;

5) When $k=1$ and $n_{s,k} \neq 1$ which indicating that there exists feedrate-non-sensitive region between the start point on the toolpath and the first sensitive region, schedule an acceleration process within this non-sensitive region; Calculate the required displacement $s_{req}(0, \dot{s}_{o,k})$ of the acceleration process from 0 to $\dot{s}_{o,k}$ using Eq. (8), and the arc length $l_{r,k}$ of this first non-sensitive region by Eq. (15);

If $s_{req}(0, \dot{s}_{o,k}) > l_{r,k}$, find a speed value $\dot{s}_{F,k}$ to meet $s_{req}(0, \dot{s}_{o,k}) = l_{r,k}$ using dichotomy method between 0 and $\dot{s}_{o,k}$;

Then, update the allowable speed value $\dot{s}_{o,k}$ of this feedrate-sensitive region by letting $\dot{s}_{o,k}=\dot{s}_{F,k}$ and goto step 7);

6) Evaluate whether it is an acceleration procedure; If $\dot{s}_{o,k} \geq \dot{s}_{o,k+1}$ is satisfied, indicating that it is an deceleration procedure, goto step 7); else, calculate the required displacement $s_{req}(\dot{s}_{o,k},\dot{s}_{o,k+1})$ of the acceleration process from $\dot{s}_{o,k}$ to $\dot{s}_{o,k+1}$, and the arc length $l_{r,k}$ of the k-th non-sensitive region;

If $s_{req}(\dot{s}_{o,k},\dot{s}_{o,k+1}) > l_{r,k}$, find a speed value $\dot{s}_{F,k}$ to meet $s_{req}(\dot{s}_{o,k},\dot{s}_{o,k+1}) = l_{r,k}$ using dichotomy method between 0 and $\dot{s}_{o,k}$; Then, update the allowable speed value $\dot{s}_{o,k}$ of this feedrate-sensitive region by letting $\dot{s}_{o,k}=\dot{s}_{F,k}$ and goto step 7);

7) if $k=N_{sr}-1$, goto step 8); Else, let k=k+1 and goto step 2);

8) When $n_{e,k}=N_d$ and $K_{f,t}<1$, judge whether the allowable speed $\dot{s}_{o,k}$ corresponding to the $N_{sr}$-th feedrate-sensitive region is updated by acceleration-procedure speed scheduling or not; If yes, calculate the ratio $K_{ba}$ between the speed value after and before updating, and let $K_{f,t}=K_{ba}\cdot K_{f,t}$; Then update the tangential acceleration constraint of the deceleration process in $N_{sr}$-th feedrate-sensitive region by $\alpha_{f,max}=K_{f,t}^2 \cdot \alpha_{t,max}$, and the tangential jerk constraint of the deceleration process in $N_{sr}$-th feedrate-sensitive region by $j_{f,max}=K_{f,t}^3 \cdot j_{t,max}$; Thus, end the bi-directional scanning;

After above backward scanning speed scheduling for deceleration procedure and forward scanning speed scheduling for acceleration procedure, the final obtained $\dot{s}_{o,k}$ is thus the final axial-drive-constraint limited speed value corresponding to k-th feedrate-sensitive region;

Step Four: Calculation of the acceleration/deceleration-start-point parameters and their corresponding speed values First, determine whether the arc length $l_{r,k}$ of the non-sensitive region is long enough for acceleration from the allowable speed $\dot{s}_{o,k}$ of the k-th sensitive region to the programmed maximum tool-tip motion speed $v_{max}$ and then deceleration to the allowable speed $\dot{s}_{o,k+1}$ of the (k+1)-th sensitive region; Videlicet judge if the inequation (19) is satisfied;

$$l_{r,k} > s_{req}(\dot{s}_{o,k}, v_{max}) + s_{req}(v_{max}, \dot{s}_{o,k+1}) \qquad (19)$$

Once Eq. (19) can be satisfied, perform acceleration from $\dot{s}_{o,k}$ to $v_{max}$ and deceleration from $v_{max}$ to $\dot{s}_{o,k+1}$ processes between the kth and (k+1)th sensitive regions in sequence; The acceleration-start-point parameter is $u_{e,k}$, and the corresponding feedrate is $\dot{s}_{o,k}$; In addition, the deceleration-start-point parameter $u_{dc}$ is computed as $$\begin{cases} n_{dp} = \text{int}\left(\dfrac{s_{req}(v_{max}, \dot{s}_{o,k+1})}{\delta_d}\right) \\ n_{dc} = n_{s,k+1} - n_{dp} \\ l_{dc} = s_{req}(v_{max}, \dot{s}_{o,k+1}) - \delta_s \cdot n_{dp} \\ u_{dc} = u_{d,n_{dc}} - \dfrac{1}{\|C'_P(u_{d,n_{dc}})\|}l_{dc} - \dfrac{C'_P(u_{d,n_{dc}}) \cdot C''_P(u_{d,n_{dc}})}{2\|C'(u_{d,n_{dc}})\|^4}l_{dc}^2 \end{cases} \qquad (20)$$

The feedrate corresponding to the deceleration-start point is $v_{max}$;

On contrary, if Eq. (19) cannot be satisfied, perform acceleration or deceleration merely between the kth and (k+1)th sensitive regions in order to keep a smooth and stable tool-tip motion; If $\dot{s}_{o,k} < \dot{s}_{o,k+1}$, execute the acceleration process; The acceleration-start-point parameter is $u_{e,k}$ and the corresponding feedrate is $\dot{s}_{o,k}$; If $\dot{s}_{o,k} > \dot{s}_{o,k+1}$, execute the deceleration process; The deceleration-start-point parameter $u_{dc}$ is calculated using the following equation;

$$\begin{cases} n_{dp} = \text{int}\left(\dfrac{s_{req}(\dot{s}_{o,k}, \dot{s}_{o,k+1})}{\delta_d}\right) \\ n_{dc} = n_{s,k+1} - n_{dp} \\ l_{dc} = s_{req}(\dot{s}_{o,k}, \dot{s}_{o,k+1}) - \delta_s \cdot n_{dp} \\ u_{dc} = u_{d,n_{dc}} - \dfrac{1}{\|C'_P(u_{d,n_{dc}})\|}l_{dc} - \dfrac{C'_P(u_{d,n_{dc}}) \cdot C''_P(u_{d,n_{dc}})}{2\|C'(u_{d,n_{dc}})\|^4}l_{dc}^2 \end{cases} \qquad (21)$$

The feedrate corresponding to this deceleration-start point is $\dot{s}_{o,k}$

After above computation, denote the total amount of the obtained acceleration/deceleration-start points as n and the set consisted by the acceleration/deceleration-start-point parameters and the corresponding feedrates as $\{ur_i, vu_i\}$, i=1, 2, . . . , n, where $ur_i$ is the i-th acceleration/deceleration-start-point parameter, and $vu_i$ is the i-th acceleration/deceleration-start-point speed;

Step Five: Real-time calculation of interpolation-point parameter and feedrate

In real-time interpolation, judge which one of the parameter range $[ur_i, ur_{i+1}]$ that the current interpolation-point parameter $u_j$ lays in, and then calculate $t_1$, $t_2$, and $t_3$:

$$t_1 = \begin{cases} \dfrac{a_{t,m}}{j_{t,m}} & |vu_{i+1} - vu_i| > \dfrac{a_{t,m}^2}{j_{t,m}} \\ \sqrt{\dfrac{|vu_{i+1} - vu_i|}{j_{t,m}}}, & |vu_{i+1} - vu_i| \leq \dfrac{a_{t,m}^2}{j_{t,m}} \end{cases} \qquad (22)$$

$$t_2 = \begin{cases} \dfrac{|vu_{i+1} - vu_i| - a_{t,m}^2/j_{t,m}}{a_{t,m}}, & |vu_{i+1} - vu_i| > \dfrac{a_{t,m}^2}{j_{t,m}} \\ 0, & |vu_{i+1} - vu_i| \leq \dfrac{a_{t,m}^2}{j_{t,m}} \end{cases}$$

$$t_3 = t_1$$

where when i=1, $\alpha_{t,m}=\alpha_{b,max}$ and $j_{t,m}=j_{b,max}$; when i=n, $\alpha_{t,m}=\alpha_{f,max}$ and $j_{t,m}=j_{f,max}$; otherwise, $\alpha_{t,m}=\alpha_{t,max}$ and $j_{t,m}=j_{t,max}$;

When the elapsed time after the interpolation-point parameter passes into the current range t is smaller than $t_1+t_2+t_3$, the feedrate $v_j$ for current interpolation point is:

$$v_j = \begin{cases} vu_i + \dfrac{1}{2}j_{t,m}t^2, & 0 \leq t < t_1 \\ v_1 + a_m(t-t_1), & t_1 \leq t < t_1+t_2 \quad v_1 = vu_i + \dfrac{1}{2}j_{t,m}t_1^2, \\ v_2 + a_m(t-t_1-t_2) - \dfrac{1}{2}j_{t,m}(t-t_1-t_2)^2, & t_2 \leq t \leq t_1+t_2+t_3 \quad v_2 = v_1 + a_m t_2, t_1 + \end{cases} \qquad (23)$$

where $\alpha_m = j_{f,max} \cdot t_1$; Otherwise, when $t \geq t_1+t_2+t_3$, the current point feedrate $v_j = vu_{i+1}$; Calculate the next interpolation-point parameter $u_{j+1}$ according to the second-order Taylor's expansion method as:

$$u_{j+1} = u_j + \frac{v_j}{\|C'_p(u_j)\|}T - \frac{v_j^2(C'_p(u_j), C''_p(u_j))}{2\|C'_p(u_j)\|^4}T^2 \quad (24)$$

where T is the interpolation period; Judge whether the ending point of the curve is reached, and if yes, end the interpolation; else, let j=j+1 and back to the beginning of Step Five; Hence, the feedrate scheduling with axial drive constraints for five-axis dual-spline interpolation can be realized five-axis machining based on the feedrate scheduling.

* * * * *